United States Patent
Ooya et al.

(10) Patent No.: US 6,753,112 B2
(45) Date of Patent: Jun. 22, 2004

(54) POSITIVE ELECTRODE ACTIVE MATERIAL AND NON-AQUEOUS SECONDARY BATTERY USING THE SAME

(75) Inventors: Yasumasa Ooya, Shizuoka-ken (JP); Ryo Sakai, Yokohama (JP); Koshin Tanaka, Yokohama (JP); Kazuki Amemiya, Fujieda (JP); Hajime Takeuchi, Yokohama (JP); Yasuhiro Shirakawa, Yokohama (JP); Shouta Endou, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 32 days.

(21) Appl. No.: 10/024,341

(22) Filed: Dec. 21, 2001

(65) Prior Publication Data

US 2002/0127473 A1 Sep. 12, 2002

(30) Foreign Application Priority Data

| Dec. 27, 2000 | (JP) | ................................... P2000-399229 |
| Jul. 4, 2001 | (JP) | ................................... P2001-203796 |
| Jul. 27, 2001 | (JP) | ................................... P2001-228443 |

(51) Int. Cl.$^7$ ............................................. H01M 4/62
(52) U.S. Cl. .................................. 429/232; 252/182.1
(58) Field of Search ....................... 429/232; 252/182.1

(56) References Cited

U.S. PATENT DOCUMENTS 5,512,214 A * 4/1996 Koksbang ............... 429/232 X
5,807,645 A * 9/1998 Takeuchi et al. ......... 429/232 X

FOREIGN PATENT DOCUMENTS

| JP | 4-162357 | * 6/1992 | ............ H01M/4/62 |
| JP | 4-355056 | 12/1992 | ............ H01M/4/58 |
| JP | 6-236756 | 8/1994 | ............ H01M/4/48 |
| JP | 2000-306584 | 11/2000 | ............ H01M/4/58 |

OTHER PUBLICATIONS

English Abstract and Computer Generated Translation of JP 6–236,756 (Suzuki et al.).*

* cited by examiner

*Primary Examiner*—Stephen J. Kalafut
(74) *Attorney, Agent, or Firm*—Foley & Lardner LLP (57) ABSTRACT

The present invention provides a positive electrode active material comprising: a positive electrode active material body; and at least one of oxide particles and carbon particles each having an average diameter of 1 μm or less; wherein at least one of oxide particles and carbon particles are adhered to a surface of the positive electrode active material body. I is preferable that a mass of the oxide particles adhered to the positive electrode material body is 0.001–2% of a mass of the positive electrode active material body. According to the above structure, there can be provided a positive electrode active material and non-aqueous secondary battery using the same capable of increasing a molding density (packing density) of the active material in a positive electrode, and capable of improving discharging rate characteristic of the battery by lowering an impedance of the electrode.

11 Claims, 2 Drawing Sheets

AFTER ADHESION OF OXIDE PARTICLES
(SiO$_2$, AVERAGE GRAIN SIZE:80nm)

FIG. 1

BEFORE ADHESION OF OXIDE PARTICLES

FIG. 2

AFTER ADHESION OF OXIDE PARTICLES
($SiO_2$, AVERAGE GRAIN SIZE:80nm)

FIG. 3

POSITIVE ELECTRODE ACTIVE MATERIAL AND NON-AQUEOUS SECONDARY BATTERY USING THE SAME

BACKGROUND OF THE INVENTION

1. Field of the Invention

The present invention relates to a positive electrode active material and non-aqueous secondary battery using the same capable of increasing a molding density (packing density) of the active material in a positive electrode, and capable of improving discharging rate characteristic of the battery by lowering an impedance of the electrode.

2. Description of the Related Art

In recent years, developments of a relatively safe negative electrode material and a non-aqueous electrolyte having an increased decomposition voltage have been advanced, so that various non-aqueous secondary batteries having a high operating voltage have been practically used in many technical fields. In particular, a secondary battery using a lithium ion has excellent characteristics such as a high discharge voltage, light weight, and a high energy density or the like, so that the demand of the secondary battery has been rapidly increased as power sources of equipments and devices such as portable telephone (cellular phone), notebook-sized personal computer, camera-integrated video recorder, and as dispersed-type power sources, power sources of EV (electrical vehicle) and HEV (hybrid electrical vehicle), and a large-scaled battery.

The lithium ion secondary battery of this type comprises: a positive electrode containing the active material and a negative electrode containing carbon, that are capable of reversibly deintercalating/intercalating lithium ion; and a non-aqueous electrolyte which is prepared by dissolving lithium salt into non-aqueous solvent.

As the positive electrode active material for the above lithium ion secondary battery, for example, lithium-cobalt composite oxides such as $LiCoO_2$, lithium-nickel composite oxides such as $LiNiO_2$, lithium-manganese composite oxides such as $LiMn_2O_4$ and other metal oxides have been generally used.

As the positive electrode for the above secondary battery, there has been generally used a positive electrode formed in such a manner that a mixture of positive electrode material consisting of Li-containing transition metal composite oxide, conductive material and binder is coated onto an Al plate as a collector, then the coated mixture is dried and followed by press-compacting the dried material.

In order to increase a charging/discharging capacity per unit volume of the above secondary battery, it is required to increase a finished density (final density) of a positive electrode material layer containing the above active material, filler, binder or the like. Therefore, for the purpose of increasing the density of the active material layer, there has been adopted a method comprising steps of: forming a positive electrode active material layer (positive electrode film); and thereafter, conducting a press-rolling operation for densifying the positive electrode film thereby to increase the density thereof.

Even if the conventional positive electrode active materials were press-densified by the press-rolling operation, the pressed material could attain a density to some extent, however, the resulting density was still insufficient indeed. That is, even if the pressing pressure is increased so as to obtain a high density for the positive electrode active material layer, a high density cannot be obtained no longer when the pressing pressure exceeds predetermined pressure level, so that there has been raised a problem that a sufficient charging/discharging capacity for the secondary battery cannot be obtained.

Further, although only a surface portion of the active material layer can be highly densified, a portion apart from the surface and close to the collector cannot obtain a sufficiently high density. At any rate, there has been raised a problem that a charging/discharging capacity and discharging rate characteristic of the secondary battery become insufficient.

Furthermore, there has been also proposed a secondary battery using a positive electrode formed in accordance with alkoxide method in which a thin film-shaped (layer-shaped) oxide layer is formed on the surface of the positive electrode active material. However, in the active material having such thin film, migration and movement of lithium ion are obstructed, so that there is posed a problem of disadvantageously lowering the battery characteristics.

On the other hand, a notebook-sized personal computer, a personal digital assistant (PDA), a cellular phone or the like have been rapidly come into wide use in recent years, and a realization of a mobile computing system is remarkably progressed. To cope with the situation, multi-functioned portable electronic devices or the like have been required to be operated for a long time. Therefore, with respect to the secondary battery to be used as the power sources for various equipments including the portable electronic devices, a technical demand for realizing compact size and a high capacity for the batteries has been raised.

SUMMARY OF THE INVENTION

The present invention had been achieved to solve the aforementioned problems and an object of the present invention is to provide a positive electrode active material and a non-aqueous secondary battery capable of increasing molding density (packing density) of the active material in a positive electrode, and capable of improving discharging rate characteristic of the battery by lowering an impedance of the electrode.

In order to achieve the aforementioned object, the inventors of this invention had prepared positive electrode active materials by adhering particles as various adhered substances onto active materials having various compositions, and the inventors had comparatively reviewed the influences of kind, adhering amount, grain size of the particles on the densifying property of the active materials.

As a result, the inventors had obtained the following knowledge. Namely, when fine oxide particles or carbon particles were adhered onto the surface of the active material body thereby to prepare a positive electrode active material, the packing characteristic of the active material could be significantly improved.

More concretely to say, the following findings were obtained. When particles of oxide of specified elements such as Bi, Sb, Al, Sn or the like were adhered to the surface of the active material body thereby to prepare the positive electrode active material, friction force among the active materials was greatly reduced thereby to increase a flowability of the active material, so that a positive electrode film having a higher density than that of the conventional one could be obtained through a rolling operation under a high pressure. As a result, there could be obtained a secondary battery excellent in charging/discharging characteristic and capacity.

In addition, when carbon particles such as general carbon black, electrically conductive carbon black, acetylene black or the like were adhered to the surface of the active material body consisting of Li-containing transition metal composite oxide thereby to prepare the positive electrode active material, electrical conductivity among the positive electrode active materials was greatly improved, so that it became possible to reduce an amount of filler which had been used in the conventional positive electrode active material layer (film) for the purpose of increasing the electrical conductivity, and thus also making it possible to increase density of the positive electrode active material layer and to improve the discharging capacity.

Furthermore, in also a case where the carbon particles were adhered to the surface of the active material, friction force among the active materials was greatly reduced thereby to increase the flowability of the active material, so that a positive electrode film having a higher density than that of the conventional one could be obtained through a rolling operation under a high pressure. As a result, there could be obtained a secondary battery excellent in charging/discharging characteristic and capacity.

In addition, the following finding was also obtained. Namely, when at least one of the oxide particles and the carbon particles were adhered to the active material and the active material was subjected to the press-rolling operation as described above, there could be obtained a positive electrode film having a uniform density of the active material in a depth direction of the positive electrode, so that an impedance of the positive electrode was lowered whereby a low-temperature characteristic and discharging rate characteristic of the secondary battery could be improved. The present invention had achieved on the basis of the aforementioned findings.

That is, a positive electrode active material according to the present invention is characterized by comprising: a positive electrode active material body; and at least one of oxide particles and carbon particles each having an average diameter of 1 μm or less; wherein at least one of oxide particles and carbon particles are adhered to a surface of the positive electrode active material body.

In the above positive electrode active material, it is preferable that the oxide particles adhered to the positive electrode active material body are particles composed of oxide of at least one element selected from the group consisting of Si, Sn, Al, Ti, Mg, Fe, Bi, Sb and Zr.

Further, it is also preferable that the oxide particles adhered to the positive electrode active material body are composed of at least one oxide particle selected from the group consisting of $SiO_2$, $SnO_2$, $Al_2O_3$, $TiO_2$, MgO, $Fe_2O_3$, $Bi_2O_3$, $Sb_2O_3$ and $ZrO_2$.

Furthermore, it is also preferable that the mass of the oxide particles adhered to the positive electrode material body is 0.001–2% of a mass of the positive electrode active material body.

Further, it is also preferable that the mass of the carbon particles adhered to the positive electrode material body is 0.001–10% of a mass of the positive electrode active material body.

Although a composition of the active material to be used as the body of the positive electrode active material according to the present invention is not particularly limited, it is preferable that the positive electrode material body is a transition metal composite oxide containing lithium expressed by a general formula:

$$Li_xM_yO_z \qquad (1)$$

wherein M denotes at least one element selected from transition metals, and $0.8 \leq x \leq 1.15$, $0.8 \leq y \leq 2.2$ and $1.5 \leq z \leq 5$.

In particular, it is more preferable to use a transition metal composite oxide containing lithium expressed by a general formula:

$$Li_xM_yO_2 \qquad (2)$$

wherein M denotes at least one element selected from transition metals, and $0.8 \leq x \leq 1.15$ and $0.8 \leq y \leq 1.1$.

In addition, it is also preferable to use a transition metal composite oxide containing lithium expressed by a general formula:

$$Li_xM_yO_4 \qquad (3)$$

wherein M denotes at least one element selected from transition metals, and $0.8 \leq x \leq 1.1$ and $1.8 \leq y \leq 2.2$.

In the Li-containing transition metal composite oxide expressed by the above general formulas (1) to (3), various transition metals such as Co, Ni, Mn, Fe, V or the like can be used as M element. In particular, it is effective to use Co as at least part of M element.

Further, it is also effective to use at least one element selected from Co and Ni as M element. It can be said that the above Li-containing Co composite oxide is preferable in view of a battery capacity. Furthermore, it is also preferable that a part of M element is replaced with metal element other than transition metal.

In the general formulas (1) and (2), a value of x is set to a range of 0.8–1.15, a value of y is set to a range of 0.85–1.1, and a value of z is set to a range of 1.5–5 respectively. On the other hand, In the general formula (3), a value of x is set to a range of 0.8–1.1 and a value of y is set to a range of 1.8–2.2 respectively. In any cases where the values of x, y and z are out of the above ranges, a sufficient battery capacity cannot be obtained. It is preferable that a ratio of x/y is set to 1 or more. When the ratio satisfies a relation x/y<1, a sufficient crystallizing property cannot be obtained thereby to lower a cycle characteristic and battery capacity.

In addition, the oxide particles composed of oxide of element selected from the group consisting of Si, Sn, Al, Ti, Mg, Fe, Bi, Sb, Zr or the like, preferably oxide particles or composite oxide particles selected from the group consisting of $SiO_2$, $SnO_2$, $Al_2O_3$, $TiO_2$, MgO, $Fe_2O_3$, $Bi_2O_3$, $Sb_2O_3$ and $ZrO_2$ to be adhered to the surface of the positive electrode active material body have a function of decreasing the friction force caused among the positive electrode active material particles. Therefore, the particles are used to increase the flowability of the active material and used to form a positive electrode active material layer having a high density when the positive electrode active material is press-molded to the collector.

Further, as the carbon particles to be adhered to the surface of the positive electrode active material, electrically conductive carbon black, acetylene black, hydrophilic carbon black, graphite can be preferably used in addition to the general carbon black. In particular, hydrophilic carbon black, which is formed by subjecting a surface reforming treatment to hydrophobic carbon black, is greatly improved in dispersibility into a water solution. Therefore, the hydrophilic carbon black is particularly effective in a case where water is used as dispersion medium.

The above carbon particles have a function of improving the electrical conductivity among the active material particles and a function of reducing the friction force caused between the positive electrode material particles, so that the carbon particles are used to increase the flowability of the active material and used to form a positive electrode active material layer having a high density when the positive electrode active material is press-molded to the collector.

In particularly, when an average grain size of the oxide particles or carbon particles to be adhered to the surface of the positive electrode active material body is set to 1 micron or less, the effect of lowering the friction force and the effect of densifying the active material layer can be further increased. It is further preferable that the average grain size of the oxide particles or carbon particles to be adhered to the surface of the positive electrode active material body is set to 0.1 micron or less.

In this connection, when coarse oxide particles or carbon particles of which average grain size (preliminary grain size) exceeds 1 μm is used, in order to obtain the above effects, a large amount of oxide particles or carbon particles are required to be adhered to the active material body. In this case, however, the packing density of the Li-containing transition metal composite oxide acting as a main substance of battery reaction is relatively lowered, so that a positive electrode exhibiting high battery characteristics cannot be obtained.

In the present invention, the above average grain size of the oxide particles or carbon particles is measured in accordance with the following manner. That is, a surface of an arbitral active material is observed by means of a scanning-type electron microscope (SEM), then substances on the surface are identified by EPMA (Electron Probe Micro Analyzer) there by to prepare a SEM image, and the sizes of the identified 10 pieces of oxide particles or carbon particles are measured from the SEM image. The average grain size is given by averaging the measured sizes.

In addition, it is preferable that the mass of the oxide particles adhered to the positive electrode material body is 0.001–2% of a mass of the positive electrode active material body. When the amount of the adhered particles is less 0.001%, the effect of lowering the friction force and the effect of press-densifying the active material layer cannot be obtained. On the other hand, when the adhesion amount of the particles is excessively large so as to exceed 2%, the amount of the active material is relatively decreased thereby to lower the battery characteristics. Therefore, the adhesion amount is set to the above range. However, the range of 0.005–1% is more preferable, and the range of 0.006–0.5% is further more preferable.

Further, it is preferable that the mass of the carbon particles adhered to the positive electrode material body is 0.001–10% of a mass of the positive electrode active material body. When the amount of the adhered particles is less than 0.001%, the aforementioned effect of improving the electrical conductivity, the effect of lowering the friction force and the effect of press-densifying the active material layer cannot be obtained. On the other hand, when the adhesion amount of the particles is excessively large so as to exceed 10%, the amount of the active material is relatively decreased thereby to lower the battery characteristics. Therefore, the adhesion amount is set to the above range. However, the range of 0.01–8% is more preferable, and the range of 0.01–3% is further more preferable.

Furthermore, a method of manufacturing the aforementioned active material body is not particularly limited. However, the positive electrode active material having above characteristics can be manufactured with a high production yield in accordance with, for example, the method comprising the steps of: blending cobalt compound and lithium compound, or at least one compound selected from the group consisting of cobalt compound, manganese compound, iron compound and aluminum compound, with a mixture consisting of cobalt compound and lithium compound so that an atomic ratio Li/(Ni+M), i.e. the atomic ratio of lithium with respect to total amount of cobalt and the replaced element M, is set to a range of 1.0–1.2 in terms of molar ratio at blending step thereby to prepare a mixed material; and retaining the mixed material at a temperature range of 680–1100° C. in air-flowing atmosphere thereby to perform a heat treatment.

As the above molar ratio, a range of 1.02–1.15 is more preferable. Further, a more preferable temperature range for the heat treatment is a range of 800–1000° C. In this connection, in the heat treatment step, the heat treating operation may be also performed in such a manner that the mixed material is stepwisely heated up through at least two stage-heating within a temperature range of 400–950° C.

As the above cobalt compound, for example, cobalt oxide, cobalt carbonate, cobalt nitrate, cobalt hydroxide, cobalt sulfate, cobalt chloride or the like can be preferably used.

Further, as the above lithium compound, for example, lithium hydroxide, lithium oxide, lithium carbonate, lithium nitrate, lithium halogenide or the like can be preferably used.

Furthermore, as the above nickel compound, for example, nickel hydroxide, nickel carbonate, nickel nitrate or the like can be preferably used.

Still further, as the above manganese compound, for example, manganese dioxides such as electrolytic manganese dioxide (EMD) or chemically prepared manganese dioxide (CMD), manganese oxyhydroxide, manganese carbonate, manganese nitrate or the like can be preferably used.

Furthermore, as the above iron compound, for example, iron oxide, iron hydroxide, iron carbonate, iron nitrate or the like can be preferably used.

Furthermore, as the above aluminum compound, for example, aluminum oxide, alumina hydrate, aluminum hydroxide, aluminum nitrate or the like can be preferably used.

Further, aforementioned heat treating step can be performed by using an electric furnace equipped with an atmosphere intake mechanism or a continuous-type furnace such as open-type pusher furnace. Further, it is preferable to perform aforementioned heat treatment for 1 to 20 hours. In this connection, a gas to be introduced into the furnace is not limited to air. When an oxygen flow is introduced into the furnace as occasion demands, it becomes also possible to increase a production efficiency of the composite oxide active material.

In addition, after the positive electrode active material body is synthesized as described above, the operation of adhering at least one particle selected from oxide particles and carbon particles onto the surface of the active material body can be performed in accordance with the following procedures. That is, thus prepared active material body is dispersed into water thereby to prepare a dispersion, while a dispersion of the oxide/carbon particles having a fine average grain size is prepared. Thereafter, a predetermined amount of the oxide or carbon particle dispersion is introduced into the active material body dispersion, and the dispersion is uniformly stirred. When the stirred dispersion is thickened and dried whereby there can be obtained a positive electrode active material in which the particles are integrally adhered to the surface of the active material body.

In this connection, for the purpose of realizing a uniform dispersion property, it is preferable to prepare the dispersion of the active material body particles and the dispersion of the oxide/carbon particles respectively, and then mix the two dispersions. However, it is also possible to mix the active material body particles with the oxide/carbon particles in a dry process without preparing the dispersion of at least one of the active material body particles and the oxide/carbon particles.

Further, after the positive electrode active material body is synthesized as described above, the operation of adhering the carbon particles onto the surface of the positive electrode active material body can be also performed in accordance with the following procedures. That is, there can be also adopted a method comprising: wet-type dispersing process in which the positive electrode active material particles and the carbon particles are dispersed into a dispersion medium consisting of water or an organic solvent thereby to prepare a dispersion; and dry process in which the dispersion medium is evaporated from thus obtained dispersion thereby to adhere the carbon particles onto the surfaced of the positive electrode active material particles.

In the above treating method, it is preferable that the above drying process is performed in accordance with a drying method selected from fluidization drying method, spray drying method, suction drying method and heat drying method.

A non-aqueous secondary battery according to the present invention is constituted by comprising: a positive electrode in which the positive electrode active material as prepared above, conduction filler (electric conductive agent) together with binder or the like are mixed and pressingly molded to be retained by the positive electrode; a negative electrode having a negative electrode active material; wherein the positive electrode and the negative electrode are provided through a non-aqueous electrolyte in a battery case so that the positive and negative electrodes are opposed to each other.

In this regard, as the conduction promoting agent described above, for example, acetylene black, carbon black, graphite or the like are used. Further, as the binder, for example, polytetrafluoroethylene (PTFE), polyvinylidene fluoride (PVDF), ethylene-butadiene-diene interpolymer (EPDM), styrene-butadiene rubber (SBR) or the like can be available.

Further, the positive electrode described above is manufactured, for example, in such a manner that the positive electrode active material described above and the binder are suspended in an appropriate solvent to prepare a suspended solution, then the suspended solution is coated onto a collector and dried, thereafter the coated collector is pressed by a pressing machine. In this regard, as a material for constituting the collector, for example, aluminum foil, stainless steel foil, nickel foil or the like are preferably used.

On the other hand, as a negative electrode active material, a material containing carbon material for deintercalating/intercalating lithium ion, or a material containing chalcogen compound, or an active material comprising a light metal can be used. In particular, when the negative electrode containing carbon material or chalcogen compound is used, the battery characteristics such as cycle life or the like is improved, thus being particularly preferable.

As examples of the carbon material for absorbing/releasing lithium ion, for example, coke, carbon fiber, pyrolytic carbon material, graphite, resin sintered body, mesophase-pitch-type carbon fiber (MCF) or sintered bodies of mesophase spherical carbon or the like are used. In particular, when the liquid crystalline mesophase-pitch-type carbon fiber (MCF) prepared by graphitizing a heavy gravity oil at a temperature higher than 2500° C. or mesophase spherical carbon is used, an electrode capacity of the battery can be increased.

Further, the above carbon materials preferably have an exothermic peak (heat peak) at a temperature of 700° C. or more, more preferably, at a temperature of 800° C. or more when the materials are subjected to a differential thermal analysis. Furthermore, assuming that (101) diffraction peak of a graphite structure of the carbon material detected by an X-ray diffraction (XRD) is ($P_{101}$) and (100) diffraction peak is ($P_{100}$), it is preferable that the carbon material has an intensity ratio of $P_{101}/P_{100}$ ranging from 0.7 to 2.2. In case of the negative electrode containing the carbon material having such the intensity ratio of the diffraction peaks, a rapidly absorbing or releasing the lithium ion can be performed, so that it is effective to combine the negative electrode with the positive electrode containing the aforementioned positive electrode active material which directs to the rapidly-charging/discharging operation.

As examples of the chalcogen compounds for absorbing/releasing lithium ion, for example, titanium disulfide ($TiS_2$), molybdenum disulfide ($MoS_2$), niobium selenide ($NbSe_2$) or the like can be used. When the chalcogen compounds are used for the negative electrode, a voltage of the secondary battery is lowered, while the capacity of the negative electrode is increased, thereby to increase the capacity of the secondary battery. In addition, a diffusing speed of the lithium ion at the negative electrode is increased, so that it is particularly effective to combine the chalcogen compound with the positive electrode active material used in the present invention.

Further, as examples of the light metals to be used for the negative electrode, for example, aluminum, aluminum alloy, magnesium alloy, lithium metal, lithium alloy or the like can be used.

Furthermore, the negative electrode containing the active material for absorbing/releasing the lithium ion can be manufactured, for example, by a method comprising the steps of suspending the above negative electrode active material and the binder into inappropriate solvent to form a suspended solution, coating the suspended solution onto a collector, and drying then press-contacting the collector. As an example of the collector, for example, collectors composed of copper foil, stainless steel foil, nickel foil or the like are used.

Further, as the binder, for example, polytetrafluoroethylene (PTFE), polyvinylidene fluoride (PVDF), ethylene-butadiene-diene copolymer (EPDM), styrene-butadiene rubber (SBR), carboxymethyl cellulose (CMC) or the like can be available.

Further, the separator described above is formed, for example, from nonwoven fabric composed of synthetic resin, polyethylene porous film, polypropylene porous film or the like.

As the non-aqueous electrolyte, a solution prepared by dissolving electrolyte (lithium salt) into anon-aqueous solvent is used.

The examples of the non-aqueous electrolyte may include cyclic carbonates such as ethylene carbonate (EC), propylene carbonate (PC) or the like; chain carbonates such as dimethyl carbonate (DMC), methyl ethyl carbonate (MEC), diethyl carbonate (DEC) or the like; chain ethers such as dimethoxyethane (DME), diethoxy ethane (DEE), ethoxymethoxy ethane or the like; cyclic ethers such as tetrahydrofuran (THF), 2-methyltetrahydrofuran (2-MeTHF) or the like; fatty acid ethers of lactone, γ-butyrolactone (γ-BL) or the like; nitrides such as acetonitrile (AN) or the like; and sulfides such as sulfolane (SL), dimethyl sulfoxide (DMSO) or the like.

The above non-aqueous solvent can be singularly used, and can be also used as a mixed solvent prepared by mixing at least two kinds of the above solvents. In particular, it is preferable to use; a solvent composed of at least one solvent selected from the group consisting of EC, PC and γ-BL; or a mixed solvent which is prepared by mixing at least one solvent selected from the group consisting of EC, PC and γ-BL with at least one solvent selected from the group consisting of DMC, MEC, DEC, DME, DEE, THF, 2-MeTHF and AN.

Further, in a case where the negative electrode active material containing carbon material for absorbing/releasing the lithium ion is used as a material for constituting the negative electrode, in view of improving the cycle life of the secondary battery comprising the negative electrode, it is preferable to use: a mixed solvent composed of EC, PC, and γ-BL; a mixed solvent composed of EC, PC, and MEC; a mixed solvent composed of EC, PC, and DEC; a mixed solvent composed of EC, PC, and DEE; a mixed solvent composed of EC and AN; a mixed solvent composed of EC and MEC; a mixed solvent composed of PC and DEC; a mixed solvent composed of PC and DEC; or a mixed solvent composed of EC and DEC.

The examples of the electrolytes may include lithium salts such as lithium perchlorate ($LiClO_4$), lithium phosphate hexafluoride ($LiPF_6$), lithium boride fluoride ($LiBF_4$), arsenic lithium hexafluoride ($LiAsF_6$), trifluoromethasulfonic lithium ($LiCF_3SO_3$), bis-trifluoromethyl sulfonylimide lithium [$LiN(CF_3SO_2)_2$] or the like. In particular, when $LiPF_6$, $LiBF_4$, $LiN(CF_3SO_2)_2$ are used, electric conductivity and safety can be improved, thus being preferable. The electrolyte containing $LiBF_4$ has a function of protecting the surface of the positive electrode active material, thus being particularly preferable.

An amount of these electrolytes to be dissolved into the non-aqueous solvent is preferably set to a range of 0.1–3.0 mol/l. This is because, when the amount (concentration) of the electrolyte exceeds 3.0 mol/l so as to provide a high lithium salt concentration, a reaction between the positive electrode active material and the electrolyte becomes active at high temperature region, thus departing from the object of the present invention.

According to the positive electrode active material and the non-aqueous secondary battery using the active material as constructed above, since at least one of the oxide particles and the carbon particles were adhered onto the surface of the active material body thereby to prepare a positive electrode active material, the friction force among the active materials is greatly reduced thereby to increase a flowability of the active material, so that a positive electrode film having a higher density than that of the conventional one can be obtained through a rolling operation under a high pressure. As a result, it becomes possible to realize a secondary battery excellent in charging/discharging characteristic and capacity.

Particularly in a case where the carbon particles are adhered to the active material body thereby to prepare the positive electrode active material, electrical conductive paths between the active material are sufficiently secured and the impedance of the electrode film is advantageously lowered, so that the discharging rate characteristic can be significantly improved.

DESCRIPTION OF THE PREFERRED EMBODIMENTS

Next, the present invention will be explained more concretely with reference to the following Examples. Note, it should be understood that the present invention shall not be limited to the following Examples, and the present invention can also be embodied in other specific forms by modifying the Examples without departing from the scope or spirit of the present invention.

EXAMPLES 1–21 AND COMPARATIVE EXAMPLES 1–7

Figure 1:
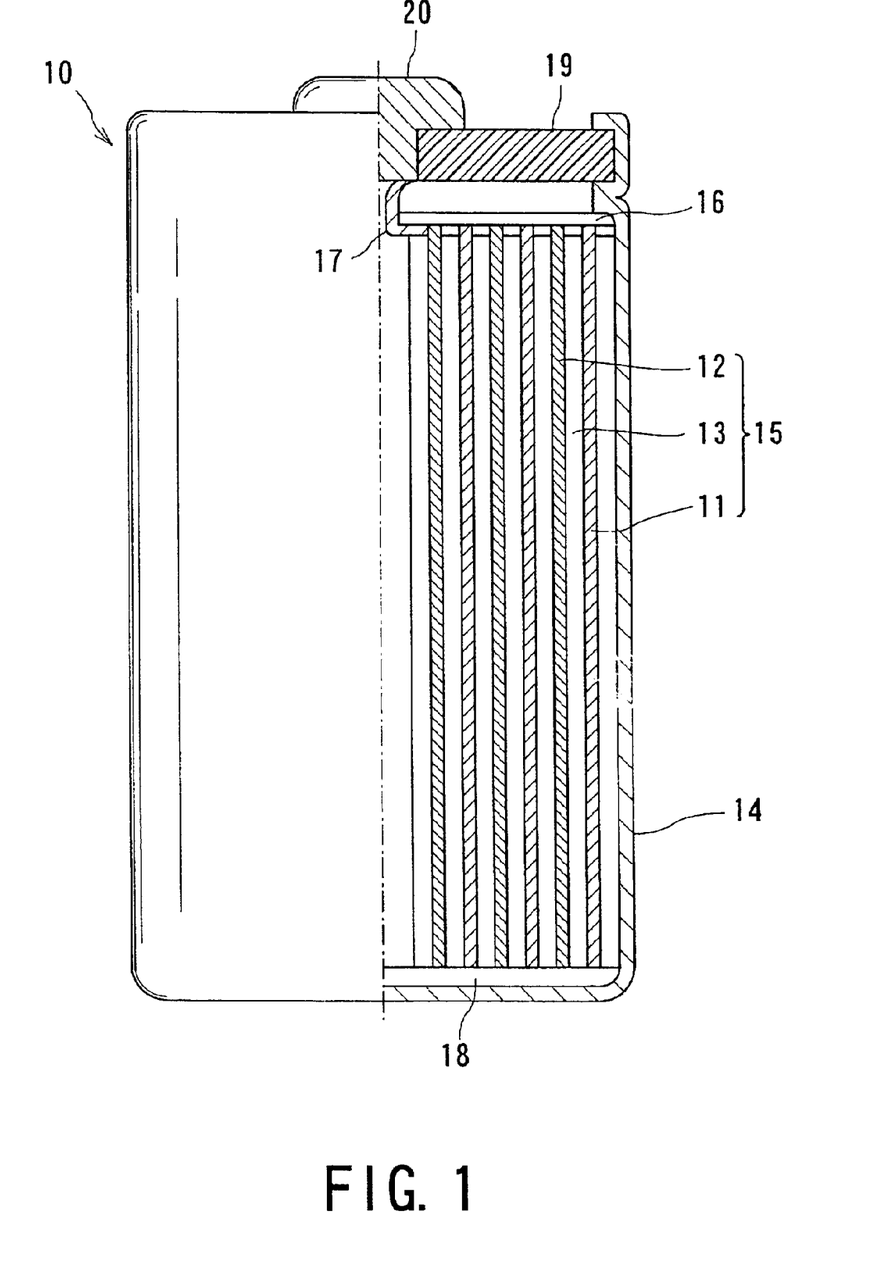
FIG. 1 is a sectional view showing a structure of a lithium ion secondary battery as a non-aqueous secondary battery according to the present invention.

In accordance with procedures as shown hereunder, non-aqueous secondary batteries (lithium ion secondary batteries) according to respective Examples and Comparative Examples shown in FIG. 1 were manufactured, and characteristics of the batteries were comparatively evaluated.

[Preparation of Positive Electrode Active Materials]

As Examples 1–15, 20 cobalt oxide powder, lithium carbonate powder or the like were blended so as to provide compositions listed in a left column of Table 1, then uniformly mixed to form material mixtures, respectively. Each of the material mixtures was fired in an air atmosphere at a temperature of 900° C. for five hours, thereby to synthesize composite oxides to be active material bodies. When diffraction patterns of the composite oxides were measured by powdery X-ray diffraction method using CuK α-ray, the resultant diffraction patterns almost conformed with a diffraction pattern of $LiCoO_2$.

On the other hand, as Examples 16–17, 21 nickel hydroxide powder, lithium carbonate powder or the like were blended so as to provide compositions listed in the left column of Table 1, then uniformly mixed to form material mixtures, respectively. Each of the material mixtures was fired in an oxygen atmosphere at a temperature of 700° C. for 10 hours, thereby to synthesize composite oxides to be active material bodies. When diffraction patterns of the composite oxides were measured by powdery X-ray diffraction method using CuK α-ray, the resultant diffraction patterns almost conformed with a diffraction pattern of $LiNiO_2$.

On the other hand, as Example 18, nickel hydroxide powder, cobalt oxide powder, lithium carbonate powder or the like were blended so as to provide a composition indicated in the left column of Table 1, then uniformly mixed to form a material mixture. The material mixture was fired in an oxygen atmosphere at a temperature of 700° C. for 10 hours, thereby to synthesize a composite oxide to be active material body. When a diffraction pattern of the composite oxide was measured by powdery X-ray diffraction method using CuK α-ray, the resultant diffraction pattern almost conformed with a diffraction pattern of $LiNi_{0.8}Co_{0.2}O_2$.

On the other hand, as Example 19, manganese oxide powder, lithium hydroxide powder or the like were blended so as to provide a composition indicated in the left column of Table 1, then uniformly mixed to form a material mixture. The material mixture was fired in an air atmosphere at a temperature of 800° C. for 10 hours, thereby to synthesize a composite oxide to be active material body. When a diffraction pattern of the composite oxide was measured by powdery X-ray diffraction method using CuK α-ray, the resultant diffraction pattern almost conformed with a diffraction pattern of $LiMn_2O_4$.

Thus prepared composite oxides were dispersed into pure water thereby to prepare active material dispersions, while each of the oxide particles and/or carbon particles having an average grain size shown in Table 1 were also dispersed into pure water thereby to prepare various oxide dispersions and/or carbon dispersions. With respect to the active material dispersions, the oxide dispersion and/or the carbon dispersion were introduced so as to attain the adhesion amounts shown in Table 1, and uniformly mixed thereby to prepare the respective mixed dispersions. Thereafter, each of the mixed dispersions was thickened and dried thereby to manufacture the positive electrode active materials of Examples in which oxide particles and/or carbon particles were adhered onto the surface of the active material body particles.

On the other hand, a positive electrode active material of Comparative Example 1 was prepared in accordance with the same procedure as in Example 1 except that 2.5 mass % of coarse oxide particles ($SiO_2$) having an average grain size of 50 μm were adhered to the active material body.

On the other hand, a positive electrode active material of Comparative Example 2 was prepared by using the active material body prepared in Example 1 without adhering any oxide particles onto the active material body.

In addition, a positive electrode active material of Comparative Example 3 was prepared by using the active material body prepared in Example 18 without adhering any oxide particles onto the active material body.

On the other hand, a positive electrode active material of Comparative Example 4 was prepared in accordance with the same procedure as in Example 1 except that coarse oxide particles ($SiO_2$) having an average grain size of 2 μm were adhered to the active material body.

On the other hand, with respect to the surfaces of the active material bodies prepared in Example 1, Example 16 and Example 19, $SiO_2$ film, $Al_2O_3$ film and $TiO_2$ films as shown in Table 1 were formed respectively, in accordance with an alkoxide method as disclosed in Japanese Patent Laid-Open No. 2000-306584, thereby to prepare positive electrode materials of Comparative Examples 5–7.

Note, the above alkoxide method is also called as "dip-cure method" which is a method comprising the steps of: preparing a metal alkoxide solution by dissolving a metal component into an alcohol; coating the metal alkoxide solution onto a surface of the active material body; and heat-treating the coated active material body.

Figure 2:
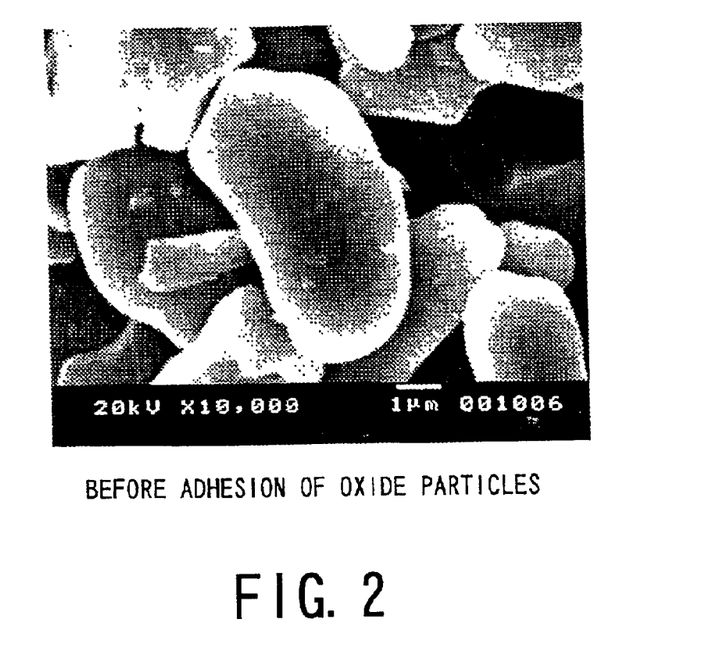
FIG. 2 is an explanatory view, taken by a scanning-type electronic microscope (SEM), showing a grain structure of the active material body at a stage before oxide particles are adhered to the active material.
Figure 3:
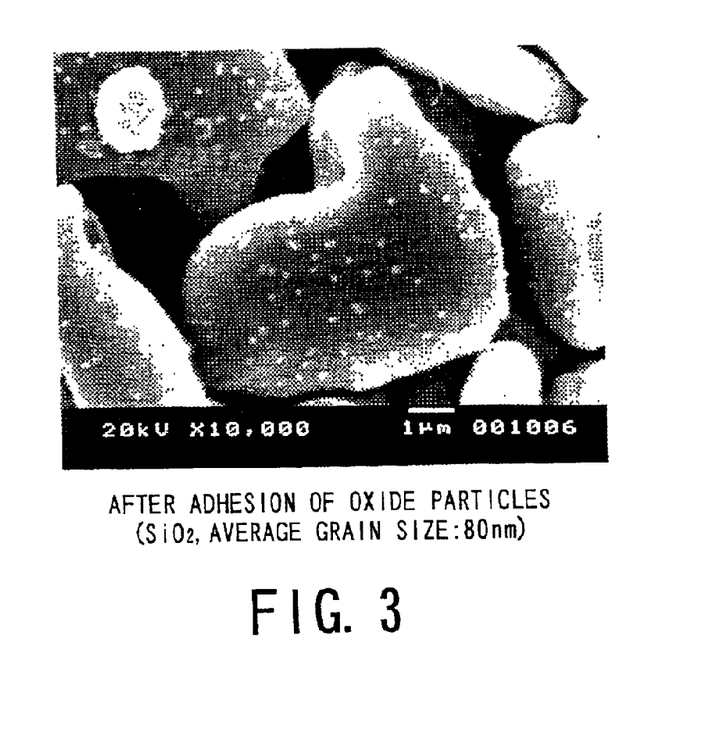
FIG. 3 is an explanatory view, taken by a scanning-type electronic microscope (SEM), showing one embodiment of a positive electrode active material according to the present invention at a stage after the oxide particles are adhered to the surface of the active material body.

The respective positive electrode active materials were observed by means of a scanning-type electron microscope (SEM), the results are shown in FIG. 2 and FIG. 3. FIG. 2 shows a grain structure of the positive electrode active material of Comparative Example 2, and shows a state where two or three fragments of the active material are uniformly adhered to the surface of the active material body.

On the other hand, FIG. 3 shows a grain structure of the positive electrode active material of Example 1, and it is possible to confirm a state where fine oxide particles ($SiO_2$) having an average grain size of 0.08 μm were uniformly adhered to the surface of $LiCoO_2$ active material body.

As a device for identifying and quantifying the oxide particles adhered to the surface of the active material body, there can be used an X-ray probe micro analyzer (EPMA) which conducts a quantitative analysis on the basis of a wavelength of a characteristic X-ray radiated from a substance when a high-speed electron beam flux is irradiated to a surface of the substance.

[Preparation of Positive Electrode]

Next, using thus obtained composite oxides as a positive electrode active material, 90 mass % of the positive electrode active material, 6 mass % of graphite as an electrically conductive agent, 4 mass % of polyvinylidene fluoride (PVDF) as the binder were blended thereby to prepare mixed materials for the respective positive electrodes. Each of the mixed materials was dispersed in N-methyl-2-pyroridone to prepare a slurry. Then, the slurry was coated on an aluminum foil, followed by drying the coated slurry. The coated foil was then press-molded by means of a roller-pressing machine. Thus obtained press-molded body was cut into a predetermined size thereby to obtain sheet-shaped positive electrodes 12.

[Preparation of Negative Electrode]

Next, 93 mass % of carbon material and 7 mass % of polyvinylidene fluoride (PVDF) as the binder were blended thereby to prepare mixed materials for the respective negative electrodes. The same procedure as in manufacturing the positive electrode was repeated except that the above mixed materials for the respective negative electrodes were used in place of those for positive electrodes, thereby to prepare a sheet-shaped negative electrode 11.

[Measuring of Density of Positive Electrode Film]

With respect to thus prepared positive electrodes for respective Examples and Comparative Examples, a density of the electrode film and a density of the active material were measured. The density of the electrode film was measured as a ratio of a weight of the electrode film with respect to a volume of the electrode film. Further, the density of the active material was measured as a ratio of a weight of Li-containing transition metal composite oxide (active material body) such as $LiCoO_2$, $LiNiO_2$ or the like contained in the electrode film with respect to the volume of the electrode film. The measuring results are shown in Table 1.

[Assembling of Battery]

Using the negative electrode 11 and the respective positive electrodes 12 as prepared above, lithium ion secondary batteries 10 as non-aqueous secondary batteries according to the respective Examples and Comparative Examples having a structure shown in FIG. 1 were assembled.

That is, in the respective lithium ion secondary batteries 10, a cylindrical battery container 14 with a bottom composed of stainless steel is provided with an insulating material 18 at the bottom of the container 14. The electrode group 15 is accommodated in the aforementioned battery container 14. An insulating paper 16 is provided to an upper portion of an electrode group 15. The electrode group 15 is formed so as to have a structure in which the positive electrode 12, a separator 13 and the negative electrode 11 are laminated in this order to form a belt-shaped laminated body and the laminated body is wound up or curled in a spiral-form so that the negative electrode 11 is positioned outside.

In this connection, a length of the positive electrode 12 and the negative electrode 11 constituting the above electrode group 15 is set to a maximum length capable of being accommodated into the battery container 14. That is, the length of the electrode is set to a length capable of obtaining the maximum capacity within a range of volume of the battery container. Due to this construction, when the battery is assembled by using the positive electrode composed of film having a high density of the active material, a large discharging capacity can be obtained.

The separator 13 is formed, for example, from non-woven fabric, polypropylene porous film or the like. The electrolyte is packed in the battery container 14. An insulating seal plate 19 having an opening at central portion thereof is provided to an upper opening portion of the battery container 14, and the insulating seal plate 19 is fluid-tightly fixed to the battery container 14 by inwardly caulking the upper opening portion of the battery container 14. The positive electrode terminal 20 is interfitted into a central portion of the insulating seal plate 19. One end of the positive electrode lead 17 is connected to the positive electrode while the other end of the lead 17 is connected to the positive electrode terminal 20. The negative electrode 11 is connected to the battery container 14 as a negative electrode terminal through a negative electrode lead (not shown).

[Evaluation of Battery]

With respect to thus prepared respective lithium ion secondary batteries according to Examples and Comparative Examples, discharging rate characteristics were measured in accordance with the following procedure. That is, the discharging current was set to two values of 1C and 4C, and a ratio of a discharging capacity Cap(1C) at the current of 1C with respect to a discharging capacity Cap(4C) at the current of 4C was measured.

In this regard, C denotes a discharge rate, and is expressed by an inverse of a hour rate (h) i.e. satisfies a relation: C=1/h. A standard discharge current is a value obtained by dividing a nominal capacity by a determined hour rate (h). For example, 1C means a discharge rate for discharging the nominal capacity in one hour. In the present invention, for the sake of convenience, a discharge current for terminating the discharge in one hour is defined as 1C. Therefore, 4C means a current value four times larger than the discharge current at 1C. The measuring results of the discharging rate characteristics for the respective secondary batteries are shown in Table 1 hereunder.

TABLE 1

| Sample No. | Composition of Active Material Body | Adhered Particles kind | Adhered Particles Average Grain Diameter (μm) | Adhered Particles Adhesion Amount (mass %) | Density of Electrode Film (g/cm³) | Density of Active Material (g/cm³) | Battery Capacity (mAh) | Discharging Rate Characteristic Cap (4C)/Cap (1C) (%) |
|---|---|---|---|---|---|---|---|---|
| Example 1 | LiCoO₂ | SiO₂ | 0.08 | 0.01 | 3.6 | 3.2 | 1820 | 85 |
| Example 2 | LiCoO₂ | Al₂O₃ | 0.05 | 0.01 | 3.4 | 3.1 | 1740 | 80 |
| Example 3 | LiCoO₂ | SnO₂ | 0.08 | 0.05 | 3.4 | 3.2 | 1810 | 82 |
| Example 4 | LiCoO₂ | TiO₂ | 0.04 | 0.008 | 3.5 | 3.3 | 1830 | 80 |
| Example 5 | LiCoO₂ | MgO | 0.06 | 0.01 | 3.3 | 3.1 | 1750 | 81 |
| Example 6 | LiCoO₂ | ZrO₂ | 0.005 | 0.02 | 3.5 | 3.3 | 1860 | 83 |
| Example 7 | LiCoO₂ | Fe₂O₃ | 0.05 | 0.03 | 3.5 | 3.3 | 1850 | 84 |
| Example 8 | LiCoO₂ | SiO₂ | 1.0 | 0.01 | 3.3 | 2.9 | 1630 | 80 |
| Example 9 | LiCoO₂ | SiO₂ | 0.05 | 2.1 | 3.4 | 3.0 | 1690 | 65 |
| Example 10 | LiCoO₂ | Bi₂O₃ | 0.05 | 0.1 | 3.7 | 3.4 | 1880 | 83 |
| Example 11 | LiCoO₂ | Bi₂O₃ | 0.01 | 0.01 | 3.4 | 3.2 | 1890 | 84 |
| Example 12 | LiCoO₂ | Sb₂O₃ | 0.02 | 0.1 | 3.7 | 3.4 | 1920 | 86 |
| Example 13 | LiCoO₂ | Sb₂O₃ | 0.01 | 0.01 | 3.6 | 3.3 | 1900 | 85 |
| Example 14 | LiCoO₂ | SnO₂ | 0.01 | 0.01 | 3.7 | 3.4 | 1880 | 85 |
| Example 15 | LiCoO₂ | MgAl₂O₄ | 0.1 | 0.01 | 3.6 | 3.2 | 1850 | 83 |
| Example 16 | LiNiO₂ | SiO₂ | 0.05 | 0.01 | 3.3 | 3.1 | 2050 | 85 |
| Example 17 | LiNiO₂ | Al₂O₃ | 0.05 | 0.01 | 3.3 | 3.1 | 2040 | 84 |
| Example 18 | LiNi₀.₈Co₀.₂O₂ | SiO₂ | 0.04 | 0.008 | 3.6 | 3.2 | 2080 | 84 |
| Example 19 | LiMn₂O₄ | SiO₂ | 0.02 | 0.05 | 3.5 | 3.1 | 1420 | 80 |
| Example 20 | LiCoO₂ | SiO₂ + Carbon Black | 0.08 0.02 | 0.01 0.01 | 3.5 | 3.3 | 1850 | 84 |
| Example 21 | LiNiO₂ | Al₂O₃ + Carbon Black | 0.05 0.04 | 0.01 0.4 | 3.3 | 3.1 | 1990 | 80 |
| Comparative Example 1 | LiCoO₂ | SiO₂ | 50 | 2.5 | 3.4 | 2.8 | 1575 | 40 |
| Comparative Example 2 | LiCoO₂ | — | — | — | 3.2 | 2.9 | 1630 | 75 |
| Comparative Example 3 | LiNi₀.₈Co₀.₂O₂ | — | — | — | 3 | 2.8 | 1600 | 74 |
| Comparative Example 4 | LiCoO₂ | SiO₂ | 2 | 0.01 | 3.4 | 2.8 | 1610 | 70 |
| Comparative Example 5 | LiCoO₂ | SiO₂ Film | — | 3.0 | 3.2 | 2.8 | 1550 | 35 |
| Comparative Example 6 | LiNiO₂ | Al₂O₃ Film | — | 0.3 | 3.3 | 3.1 | 1830 | 61 |
| Comparative Example 7 | LiMn₂O₄ | TiO₂ Film | — | 0.03 | 3.5 | 2.9 | 1280 | 62 |

As is clear from the results shown in Table 1, in the respective lithium ion secondary batteries of Examples using the positive electrode active materials to which predetermined amount of the oxide particles and/or the carbon particles were adhered to the surface of the positive electrode active material bodies, since the electrode film density was greatly increased in comparison with the secondary batteries of Comparative Examples 2 and 3 adhered with no oxide particles, it became possible to increase the battery capacity per unit volume of the electrode film. In accordance with this improvement, it became possible to pack a large amount of positive electrode active material into the batteries, so that the secondary batteries having a high capacity could be realized.

In particular, as is clear from the batteries of Examples 10–13, it was confirmed that both a high density of the active material and a high battery capacity were obtained and an excellent discharging rate characteristic was realized in a case where $Bi_2O_3$ particles or $Sb_2O_3$ particles as oxide particles were adhered to the active material bodies.

Further, although the oxide particles are electrically insulating substances, if the adhering amount of the oxide particles is within an appropriate range, the electrically conductive paths in the electrode can be sufficiently secured, so that the addition of the oxide particles would result in no increase of impedance of the electrode.

In addition, due to the adhesion of the oxide particles, the flowability of the positive electrode active material was increased, a uniform film structure could be obtained through a press-rolling operation, the electrode film was formed to be uniform in density, thereby to effectively lower the impedance of an entire electrode film. Therefore, it was confirmed that the discharging rate characteristic of the battery was sufficiently improved in comparison with the conventional battery using an active material to which the oxide particles were not adhered.

On the other hand, as shown in the batteries of Example 9 and Comparative Example 1 in which the adhesion amount was excessively large so as to be 2 mass % or more, it was confirmed that the oxide particles as the insulating substance functioned as a barrier for obstructing the migration or movement of lithium (Li) ion, and the electrically conductive paths could not be sufficiently secured, so that the impedance of the electrode was increased thereby to deteriorate the discharging rate characteristic of the battery.

Further, as shown in the secondary batteries of Comparative Examples 5–7 using the positive electrode in which a thin film-shaped (laminar-shaped) oxide layer was formed on the surface of the positive electrode active material in accordance with an alkoxide method or the like, it was confirmed that the movement of lithium (Li) ion was obstructed by the oxide layer thereby to lower the battery characteristic.

Particularly in a case of Comparative Examples 5–7 in which oxide films were coated onto the surfaces of the active material bodies, the capacity was further lowered while the rate characteristic was also deteriorated even if the coated amounts were set to the same values as in the present invention. Therefore, in a case where the coated amount was large, the great lowering of the capacity and the significant deterioration of the rate characteristic were observed. Further, even if the coated amount was small, the capacity was disadvantageously lowered in proportional to the small-coated amount. Furthermore, since the surface of the active material body was tightly and uniformly covered by the oxide film, the rate characteristic was slightly deteriorated.

Next, embodiments in which carbon particles are adhered to the surface of the active material will be explained more concretely with reference to the following Examples.

EXAMPLES 101–109 AND COMPARATIVE EXAMPLES 101–103

In accordance with the following procedure, non-aqueous secondary batteries (lithium ion secondary batteries) according to respective Examples and Comparative Examples shown in FIG. 1 were manufactured, and characteristics of the batteries were comparatively evaluated.

[Preparation of Positive Electrode Active Materials]

As Examples 101–103, cobalt oxide powder, lithium carbonate powder or the like were blended so as to provide compositions listed in a left column of Table 2, then uniformly mixed to form material mixtures, respectively. Each of the material mixtures was fired in an air atmosphere at a temperature of 900° C. for five hours, thereby to synthesize composite oxides to be active material bodies. When diffraction patterns of the composite oxides were measured by powdery X-ray diffraction method using CuK α-ray, the resultant diffraction patterns almost conformed with a diffraction pattern of $LiCoO_2$.

On the other hand, as Examples 104–106, nickel hydroxide powder, lithium carbonate powder or the like were blended so as to provide compositions listed in the left column of Table 2, then uniformly mixed to form material mixtures, respectively. Each of the material mixtures was fired in an oxygen atmosphere at a temperature of 700° C. for 10 hours, thereby to synthesize composite oxides to be active material bodies. When diffraction patterns of the composite oxides were measured by powdery X-ray diffraction method using CuK α-ray, the resultant diffraction patterns almost conformed with a diffraction pattern of $LiNiO_2$.

On the other hand, as Examples 107–109, manganese oxide powder, lithium hydroxide powder or the like were blended so as to provide compositions indicated in the left column of Table 2, then uniformly mixed to form material mixtures. Each of the material mixtures was fired in an air atmosphere at a temperature of 800° C. for 10 hours, thereby to synthesize composite oxides to be active material bodies. When a diffraction pattern of the composite oxide was measured by powdery X-ray diffraction method using CuK α-ray, the resultant diffraction pattern almost conformed with a diffraction pattern of $LiMn_2O_4$.

Thus prepared composite oxides were dispersed into pure water thereby to prepare active material dispersions, while each of the carbon particles having an average grain size shown in Table 2 was also dispersed into pure water thereby to prepare various carbon dispersions. With respect to the active material dispersions, the carbon dispersion was introduced so as to attain the adhesion amounts shown in Table 2, and uniformly mixed thereby to prepare the respective mixed dispersions. Thereafter, each of the mixed dispersions was thickened and dried thereby to manufacture the positive electrode active materials of Examples in which carbon particles were adhered onto the surface of the active material body particles.

On the other hand, a positive electrode active material of Comparative Example 101 was prepared in accordance with the same procedure as in Example 101 except that the carbon particles were not adhered to the active material body.

On the other hand, a positive electrode active material of Comparative Example 102 was prepared by using the active material body prepared in Example 104 without adhering any carbon particles onto the active material body.

In addition, a positive electrode active material of Comparative Example 103 was prepared by using the active material body prepared in Example 107 without adhering any carbon particles onto the active material body.

[Preparation of Positive Electrode]

Next, using thus obtained composite oxides of Examples and comparative Examples as a positive electrode active material, amounts of electrically conductive material and binding material (binder) were controlled so as to establish a weight ratio of the positive electrode active material: carbon conductive material: binder=90:6:4, thereby to prepare mixed materials for the respective positive electrodes.

In a case where the adhesion amount X of the carbon exceeded 6%, the weight ratio of the positive electrode active material: carbon conductive material: binder was controlled to be 90:X:4. As the carbon conductive material, graphite was used while polyvinylidene fluoride (PVDF) was used as the binder.

Each of the mixed materials was dispersed in N-methyl-2-pyroridone to prepare a slurry. Then, the slurry was coated on an aluminum foil, followed by drying the coated slurry. The coated foil was then press-molded by means of a roller-pressing machine. Thus obtained press-molded body was cut into a predetermined size thereby to obtain sheet-shaped positive electrodes 12 as shown in FIG. 1.

[Preparation of Negative Electrode]

Next, 93 mass % of carbon material and 7 mass % of polyvinylidene fluoride (PVDF) as the binding agent (binder) were blended thereby to prepare mixed materials for the respective negative electrodes. The same procedure as in manufacturing the positive electrode was repeated except that the above mixed materials for the respective negative electrodes were used in place of those for positive electrodes, thereby to prepare a sheet-shaped negative electrode 11.

[Measuring of Impedance and Density of Positive Electrode Film]

With respect to thus prepared positive electrodes for the respective Examples and Comparative Examples, impedance and density of the electrode film and a density of the active material were measured. The density of the electrode film was measured as a ratio of a weight of the electrode film with respect to a volume of the electrode film. Further, the density of the active material was measured as a ratio of a weight of Li-containing transition metal composite oxide (active material body) such as $LiCoO_2$, $LiNiO_2$ or the like contained in the electrode film with respect to the volume of the electrode film. The measuring results are shown in Table 2.

[Assembling of Battery]

Using the negative electrode 11 and the respective positive electrodes 12 as prepared above, lithium ion secondary batteries 10 as non-aqueous secondary batteries according to the respective Examples and Comparative Examples having a structure shown in FIG. 1 were assembled.

[Evaluation of Battery]

With respect to thus prepared respective lithium ion secondary batteries according to Examples and Comparative Examples, discharging rate characteristics were measured in accordance with the following procedure. That is, the discharging current was set to two values of 1C and 4C, and a ratio of a discharging capacity Cap(1C) at the current of 1C with respect to a discharging capacity Cap(4C) at the current of 4C was measured.

In this regard, C denotes a discharge rate, and is expressed by an inverse of a hour rate (h) i.e. satisfies a relation: C=1/h. A standard discharge current is a value obtained by dividing a nominal capacity by a determined hour rate (h). For example, 1C means a discharge rate for discharging the nominal capacity in one hour. In the present invention, for the sake of convenience, a discharge current for terminating the discharge in one hour is defined as 1C. Therefore, 4C means a current value four times larger than the discharge current at 1C. The measuring results of the discharging rate characteristics for the respective secondary batteries are shown in Table 2 hereunder.

TABLE 2

| Sample No. | Composition of Active Material Body | Adhered Carbon Particle | | | Impedence of Positive Electrode (Ω) | Density of Electrode Film (g/cm³) | Density of Active Material (g/cm³) | Battery Capacity (mAh) | Discharging Rate Characteristic Cap (4C)/Cap (1C) (%) |
| --- | --- | --- | --- | --- | --- | --- | --- | --- | --- |
| | | kind | Primary Grain Size (µm) | Adhesion Amount (mass %) | | | | | |
| Example 101 | $LiCoO_2$ | Carbon Black | 0.05 | 3 | 0.64 | 3.4 | 3.1 | 1750 | 80 |
| Example 102 | $LiCoO_2$ | Carbon Black | 0.03 | 0.2 | 0.62 | 3.5 | 3.3 | 1840 | 82 |
| Example 103 | $LiCoO_2$ | Carbon Black | 0.05 | 11.0 (excess) | 2.7 | 2.5 | 2.1 | 1160 | 54 |
| Example 104 | $LiNiO_2$ | Carbon Black | 0.08 | 5 | 0.99 | 3.4 | 3.1 | 1925 | 75 |
| Example 105 | $LiNiO_2$ | Carbon Black | 0.02 | 0.4 | 0.72 | 3.5 | 3.2 | 1982 | 78 |
| Example 106 | $LiNiO_2$ | Carbon Black | 0.1 | 1 | 0.86 | 3.5 | 3.2 | 1968 | 74 |
| Example 107 | $LiMn_2O_4$ | Carbon Black | 0.04 | 0.05 | 1.15 | 3.2 | 3.1 | 1410 | 74 |
| Example 108 | $LiMn_2O_4$ | Carbon Black | 0.09 | 8 | 1.24 | 2.7 | 2.4 | 1365 | 70 |
| Example 109 | $LiMn_2O_4$ | Carbon Black | 1.2 | 2 | 1.6 | 3.1 | 2.9 | 1250 | 66 |
| Comparative Example 101 | $LiCoO_2$ | — | — | — | 1.1 | 3.2 | 2.9 | 1610 | 70 |
| Comparative Example 102 | $LiNiO_2$ | — | — | — | 1.35 | 3.1 | 2.9 | 1850 | 65 |
| Comparative Example 103 | $LiMn_2O_4$ | — | — | — | 1.42 | 3.2 | 2.9 | 1300 | 68 |

As is clear from the results shown in Table 2, in the respective lithium ion secondary batteries of Examples using the positive electrode active materials to which predetermined amount of the carbon particles were adhered to the surface of the positive electrode active material bodies, since the electrode film density was greatly increased in comparison with the secondary batteries of Comparative Examples 101, 102 and 103 adhered with no carbon particles, it became possible to increase the battery capacity per unit volume of the electrode film. In accordance with this improvement, it became also possible to pack a large amount of positive electrode active material into the batteries, so that the secondary batteries having a high capacity could be realized.

Further, in the positive electrode formed of the active material to which the carbon particles are adhered, the electrically conductive paths are sufficiently secured in the electrode, so that the impedance of the electrode film is effectively and advantageously lowered and the discharging rate characteristic of the battery can be significantly improved.

In addition, due to the adhesion of the carbon particles, the flowability of the positive electrode active material was increased, a uniform film structure could be obtained through a press-rolling operation, the electrode film was formed to be uniform in density, thereby to synergistically lower the impedance of an entire electrode film. Therefore, it was confirmed that the discharging rate characteristic of the battery was sufficiently improved in comparison with the conventional battery using an active material to which the carbon particles were not adhered.

On the other hand, as shown in the battery of Example 103 in which the adhesion amount of the carbon particles was excessively large so as to be 10 mass % or more, it was confirmed that a retention of the electrolyte could not be sufficiently secured, so that the impedance of the electrode was increased thereby to deteriorate the discharging rate characteristic of the battery.

As described above, according to the positive electrode active material and the non-aqueous secondary battery using the active material of the present invention, since at least one of the oxide particles and the carbon particles were adhered onto the surface of the active material body thereby to prepare a positive electrode active material, the friction force among the active materials is greatly reduced thereby to increase a flowability of the active material, so that a positive electrode film having a higher density than that of the conventional one can be obtained through a rolling operation under a high pressure. As a result, it becomes possible to realize a secondary battery excellent in charging/discharging characteristic and capacity.

Particularly in a case where the carbon particles are adhered to the active material body thereby to prepare the positive electrode active material, electrically conductive paths between the active materials are sufficiently secured and the impedance of the electrode film is advantageously lowered, so that the discharging rate characteristic can be significantly improved.

What is claimed is:

1. A positive electrode active material comprising:
    a positive electrode active material body; and
    at least one of oxide particles and carbon particles each having an average diameter of 1 μm or less; wherein said at least one of oxide particles and carbon particles are adhered to a surface of said positive electrode active material body.

2. A positive electrode active material according to claim 1, wherein the oxide particles are adhered to the surface of said positive electrode active material body, and a mass of said oxide particles adhered to said positive electrode active material body is 0.001–2% of a mass of said positive electrode active material body.

3. A positive electrode active material according to claim 1, wherein said oxide particles adhered to said positive electrode active material body are particles composed of oxide of at least one element selected from the group consisting of Si, Sn, Al, Ti, Mg, Fe, Bi, Sb and Zr.

4. A positive electrode active material according to claim 1, wherein said oxide particles adhered to said positive electrode active material body are composed of at least one oxide particle selected from the group consisting of $SiO_2$, $SnO_2$, $Al_2O_3$, $TiO_2$, MgO, $Fe_2O_3$, $Bi_2O_3$, $Sb_2O_3$ and $ZrO_2$.

5. A positive electrode active material according to claim 1, wherein the carbon particles are adhered to the surface of said positive electrode active material body, and a mass of said carbon particles adhered to said positive electrode active material body is 0.001–10% of a mass of said positive electrode active material body.

6. A positive electrode active material according to claim 1, wherein said positive electrode material body is a transition metal composite oxide containing lithium expressed by a general formula: $Li_xM_yO_z$ wherein M denotes at least one element selected from transition metals, and $0.8 \leq x \leq 1.15$, $0.8 \leq y \leq 2.2$ and $1.5 \leq z \leq 5$.

7. A positive electrode active material according to claim 1, wherein said positive electrode material body is a transition metal composite oxide containing lithium expressed by a general formula: $Li_xM_yO_z$ wherein M denotes at least one element selected from transition metals, and $0.8 \leq x \leq 1.15$ and $0.8 \leq y \leq 1.1$.

8. A positive electrode active material according to claim 1, wherein said positive electrode material body is a transition metal composite oxide containing lithium expressed by a general formula: $Li_xM_yO_z$ wherein M denotes at least one element selected from transition metals, and $0.8 \leq x \leq 1.1$ and $1.8 \leq y \leq 2.2$.

9. A non-aqueous secondary battery comprising:
    a positive electrode containing a positive electrode active material comprising a positive electrode active material body; and at least one of oxide particles and carbon particles each having an average diameter of 1 μm or less; wherein said at least one of oxide particles and carbon particles are adhered to a surface of said positive electrode active material body;
    a negative electrode provided to said positive electrode through a separator;
    a battery container for accommodating said positive electrode, separator and negative electrode; and
    a non-aqueous electrolyte injected into said battery container.

10. A non-aqueous secondary battery according to claim 9, wherein said oxide particles adhered to said positive electrode active material body are composed of at least one oxide article selected from the group consisting of $SiO_2$, $SnO_2$, $Al_2O_3$, $TiO_2$, MgO, $Fe_2O_3$, $Bi_2O_3$, $Sb_2O_3$ and $ZrO_2$.

11. A positive electrode active material according to claim 1, wherein said at least one of oxide particles and carbon particles are adhered only to a surface of said positive electrode active material body.

* * * * *